United States Patent
Natwick et al.

(10) Patent No.: US 9,318,024 B1
(45) Date of Patent: Apr. 19, 2016

(54) MYFLIGHT—AN AUTOMATED SERVICE FOR REAL-TIME AIRCRAFT POSITION AND COMMUNICATION STATUS

(71) Applicant: Satcom Direct, Inc., Satellite Beach, FL (US)

(72) Inventors: Jason T. Natwick, Melbourne, FL (US); Brian A. Rudloff, Satellite Beach, FL (US)

(73) Assignee: Satcom Direct, Inc., Melbourne, FL (US)

( * ) Notice: Subject to any disclaimer, the term of this patent is extended or adjusted under 35 U.S.C. 154(b) by 0 days.

(21) Appl. No.: 14/046,402

(22) Filed: Oct. 4, 2013

(51) Int. Cl.
*G06F 19/00* (2011.01)
*G06G 7/70* (2006.01)
*G06G 7/76* (2006.01)
*G08G 5/00* (2006.01)

(52) U.S. Cl.
CPC .................................. *G08G 5/0013* (2013.01)

(58) Field of Classification Search
CPC .............................. H04W 12/06; G06F 15/16
USPC ........................................................ 701/120
See application file for complete search history.

(56) References Cited

U.S. PATENT DOCUMENTS

| | | | | |
|---|---|---|---|---|
| 6,529,820 B2 * | 3/2003 | Tomescu | ............... | G01S 5/0063 342/36 |
| 7,668,632 B2 * | 2/2010 | Vian | ...................... | G07C 5/085 700/26 |
| 7,739,167 B2 * | 6/2010 | Breen | .................... | G06Q 40/00 342/454 |
| 7,908,077 B2 * | 3/2011 | Smith | .................... | G06Q 10/10 340/945 |
| 8,369,812 B2 * | 2/2013 | Lehman | ............... | H04B 17/345 455/230 |

(Continued)

FOREIGN PATENT DOCUMENTS

WO      WO 2008139062 A2 *    11/2008
WO      WO 2009097042 A1 *    8/2009     .............. H04L 29/08

OTHER PUBLICATIONS

Rockwell Collins, EBACE 2012 Press Kit, retrieved on Oct. 14, 2013, retrieved from http://www.rockwellcollins.com/sitecore/content/Data/News/2012_2012_Yr/CS/FY12CSN . . . , 2 pages.

(Continued)

*Primary Examiner* — John R Olszewski
*Assistant Examiner* — Jean-Paul Cass
(74) *Attorney, Agent, or Firm* — Brian S. Steinberger; Law Offices of Brian S. Steinberger, P.A.

(57) ABSTRACT

Methods and systems for an automated real time cabin status and position reporting system with an application on a user mobile device for initiating a request for cabin status and position, an aircraft internet connection aboard the aircraft for receiving and transmitting the request with aircraft identification, and a ground network to receive the request and aircraft identification and return real time cabin status and position reports corresponding to aircraft identification. The ground network can use transceiver receiving real time aircraft flight information from third parties, a lookup table for matching received aircraft identification with subscribing aircraft configuration data, and a processing device for executing a set of instructions for matching received aircraft identification with subscribing aircraft configuration data, processing real-time flight information corresponding to aircraft identification and compiling cabin status and position reports from corresponding aircraft configuration data and incoming real time flight information.

15 Claims, 6 Drawing Sheets

(56) References Cited

U.S. PATENT DOCUMENTS

| | | | | |
|---|---|---|---|---|
| 8,594,931 B2* | 11/2013 | Sterkel | | H04H 60/70 701/454 |
| 8,762,047 B2* | 6/2014 | Sterkel | | H04H 60/70 701/409 |
| 8,989,053 B1* | 3/2015 | Skaaksrud | | H04W 12/06 370/255 |
| 9,001,743 B2* | 4/2015 | Alizadeh-Shabdiz | | 370/328 |
| 9,182,231 B2* | 11/2015 | Skaaksrud | | H04W 12/06 |
| 9,182,232 B2* | 11/2015 | Skaaksrud | | H04W 12/06 |
| 2003/0093187 A1* | 5/2003 | Walker | | B64C 13/20 701/1 |
| 2005/0187677 A1* | 8/2005 | Walker | | B64C 13/20 701/16 |
| 2005/0198271 A1* | 9/2005 | Rubinstein | | H04L 41/12 709/224 |
| 2009/0239475 A1* | 9/2009 | Lehman | | H04B 17/345 455/67.13 |
| 2010/0167723 A1* | 7/2010 | Soumier | | H04B 7/18506 455/431 |
| 2010/0217458 A1* | 8/2010 | Schweiger | | B64D 11/0624 701/3 |
| 2011/0046920 A1* | 2/2011 | Amis | | G01S 19/16 702/181 |
| 2012/0166576 A1* | 6/2012 | Orsini | | G06F 11/1471 709/217 |
| 2012/0232782 A1* | 9/2012 | Sterkel | | H04H 20/62 701/409 |
| 2012/0232791 A1* | 9/2012 | Sterkel | | H04H 20/62 701/454 |
| 2013/0219429 A1* | 8/2013 | Hirsch | | G06F 8/20 725/37 |
| 2013/0283305 A1* | 10/2013 | Hirsch | | G06F 8/20 725/14 |
| 2014/0024395 A1* | 1/2014 | Johnson | | H04W 4/02 455/456.3 |
| 2014/0045420 A1* | 2/2014 | Tong | | H04B 7/18506 455/12.1 |
| 2014/0053243 A1* | 2/2014 | Walsh | | H04L 63/0236 726/4 |
| 2014/0081483 A1* | 3/2014 | Weinmann | | G08G 5/0021 701/14 |
| 2014/0248588 A1* | 9/2014 | Williams | | G09B 9/006 434/47 |
| 2014/0282038 A1* | 9/2014 | Royster | | G01C 21/206 715/738 |
| 2014/0315166 A1* | 10/2014 | Williams | | G09B 9/006 434/220 |

OTHER PUBLICATIONS

Vandel, et al., Head-Up Guidance System Technology—A Clear Path to Increasing Flight Safety, Flight Safety Foundation, 2009, 29 pages.

Rockwell Collins, Ascent Mobile Applications, 2012, 2 pages.

Rockwell Collins, Falcon Cabin HD, Elevate your flight experience, 2012, 12 pages.

Rockwell Collins, Pro Line Fusion Advanced Avionics, 2011, 8 pages.

Rockwell Collins, Venue High-Definition Cabin Management System, 2012, 12 pages.

Rockwell Collins, Rockwell Collins to provide advanced cabin management and HD entertainment system for Falcon 7X and Falcon 900LX, News Release, 2012, 1 page.

Rockwell Collins, Jet Aviation St. Louis to install Rockwell Collins' Venue HD cabin system on a Global Express, News Release, 2012, 2 pages.

Rockwell Collins, Airshow 4000, retrieved on Oct. 4, 2013, retrieved from http://www.rockwellcollins.com/sirecore/content/Data/Products/Cabin/Moving_Map_syst . . . , 2 pages.

Rockwell Collins, Airshow App for Mobile Devices, 2012, 4 pages.

Rockwell Collins, Airshow 4000 Version 2, 2013, 9 pages.

* cited by examiner

MYFLIGHT—AN AUTOMATED SERVICE FOR REAL-TIME AIRCRAFT POSITION AND COMMUNICATION STATUS

FIELD OF THE INVENTION

This invention relates to communication and, in particular, to methods, systems and devices for providing real time cabin status updates and position reports between an in-flight space craft (either aircraft or outer-space craft) and a terrestrial network including a specific query function which identifies the specific space craft, enables direct location and cabin status information and features communication between ground equipment and the space craft.

BACKGROUND AND PRIOR ART

There are a few known versions of moving map systems for space craft in industry today. All of these systems require a hardware subsystem aboard the aircraft that is integrated into the aircraft. Many systems require satellite connectivity to maintain updates and status information; however, the hardware aboard the aircraft is required to acquire the aircraft position data.

Prior art systems have utilized hardware to make the position information known. This includes, but is not limited to, space craft position, speed, altitude, heading, and identification. Customers are provided with a hardware subsystem to install and operate on their space craft. The subsystem is customized to each customer's space craft and typically requires a subscription fee to operate.

An example of a prior art system is Rockwell Collins Airshow™ for iPad and Airshow® Moving Map which goes mobile with iTunes® download. A limitation with the Rockwell Collins service is that it uses wifi signals from equipment aboard the aircraft. The only data displayed to the user is data that is received from actual aircraft equipment. The information from the aircraft equipment is received at the ground station, processed, and configured to be sent via wifi to the user.

Another problem with prior art systems is that they only provide aircraft location information. They do not include information such as the aircraft telephone number, connectivity instructions, or a television channel lineup for the space craft. Thus, prior art subsystems are expensive and limited at best.

To solve the aforementioned problems, there is a need for a position reporting subsystem to enable position reports and real time cabin information about an aircraft anywhere in the world using internet connection that does not require human intervention.

SUMMARY OF THE INVENTION

A primary objective of the present invention is to provide methods, systems and devices for a system providing real time status updates and position reports between a space craft (either aircraft or outer-space craft) and a terrestrial network.

A secondary objective of the present invention is to provide methods, systems and devices for an automated service for real time space craft (either aircraft or outer-space craft) position and communication status, referred to herein as the MyFlight application is a moving map service providing passengers real time flight information—wherever and whatever they fly.

A third objective of the present invention is to provide methods, systems and devices for a position reporting subsystem to enable exact position reports and real time cabin information about an aircraft anywhere in the world with internet connection without the necessity for human intervention.

A fourth objective of the present invention is to provide methods, systems and devices for a ground to space craft (either aircraft or outer-space craft) system that is fully independent and requires no additional hardware on the aircraft other than an internet connection.

A fifth objective of the present invention is to provide methods, systems and devices for an aircraft system that provides a real time cabin system with comprehensive features between aircraft and terrestrial networks on a global coverage basis.

A method for displaying real-time space craft information to a user traveling on a space craft (either aircraft or outer-space craft) comprising the steps of connecting to an internet connection aboard a space craft from a user mobile communication device, launching a space craft status application on the mobile communication device, initiating a communication from the space craft internet connection and a ground network in response to launching the space craft status application, transmitting the space craft position report and cabin status from the ground network to the application, and displaying the space craft position report and cabin status on the mobile device.

The transmitting step can include the steps of searching a subscription database at the ground network for the space craft corresponding with the launched application, returning and displaying an error message on the mobile communication device when a match to the space craft is not found, and determining a space craft position report and cabin status when a match to the space craft is found.

Launching an application can includes the step of downloading the application from an online application source provider for a fee.

Initiating a communication can include the step of sending a request for space craft information and a space craft identifier to the ground network.

The space craft position status returned to the application can be selected from a group consisting of destination, planned flight route, actual fight route, moving map, speed, altitude and distance.

The cabin status returned to the application can include at least one of cabin configuration, an aircraft telephone number and a television lineup corresponding to the space craft.

The method can further include the steps of subscribing to the space craft status service for one or more different space craft identifications, and registering the subscribing space craft at the ground network including one or more of a space craft identification and a cabin configuration corresponding to the space craft identification.

Determining a space craft position status and cabin status can include the step of receiving streaming space craft data from one or more third party sources.

The determining a space craft position status and cabin status step can include receiving space craft flight related data from one or more third party sources.

The method can include the steps assigning a priority level to the space craft data received from the third party source, and compiling the position report from the received space craft data based on the assigned priority.

The method can be used for the air craft such as but not limited to commercial and private jets, smaller aircraft, and the like, and an outer-space craft.

An automated real time cabin status and position reporting system can include an application on a user mobile communication device for initiating a request for the real time cabin status and position report, an aircraft internet aboard the aircraft for receiving the request and transmitting the request and an aircraft identification, and a ground network in communication with the aircraft internet connection to receive the transmitted request and aircraft identification and returning the real time cabin status and position report corresponding to the aircraft identification.

The ground network can include a transceiver for receiving real time aircraft flight information from the third party source, a lookup table for matching the received aircraft identification with a subscribing aircraft configuration data, and a processing device for executing a set of instructions for matching the received aircraft identification with the subscribing aircraft configuration data, processing the real-time flight information corresponding to the aircraft identification and compiling the cabin status and position report from the corresponding aircraft configuration data and the incoming real time flight information.

The set of instructions can include an identification subset of instructions for matching the received aircraft identification with subscribing aircraft identifications in the lookup table and returning a notification to the user mobile communication device;

The third party real time aircraft flight information can include flight information from U.S. Federal Aviation Authority FAA and the Canadian aviation authority NAV Canada.

The system can have actual flight data transmitted from onboard aircraft modules.

The aircraft position report returned to the application can be selected from a group consisting of destination, planned flight route, actual fight route, moving map, speed, altitude and distance.

The cabin status returned to the application can include at least one of cabin configuration, an aircraft telephone number and a television lineup corresponding to the aircraft identification.

The application can be compatible with aviation IP-based broadband connectivity solutions. The position report can include a moving map view.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The term space craft covers both aircraft, such as but not limited to private jets and commercial jets, and small aircraft flying within normal aircraft ranges, as well as outer-space craft for orbiting the earth or traveling outside the earth.

The methods and systems of the present invention generally pertains to a system providing real time status updates and position reports between a space craft and a terrestrial network. Specifically, the invention relates to a specific query function which identifies the specific space craft (non-commercial airplane) and enables direct location as well as other cabin status features between ground equipment and the space craft.

The automated service for real time space craft position and communication status, referred to as MyFlight hereinafter, is a moving map service that provides passengers real time flight information—wherever and whatever they fly. The MyFlight system is designed to be completely mobile. The MyFlight system and application does NOT require any additional hardware aboard the aircraft, no installs, no upgrades and thus, no down time. All passengers on the aircraft need is a mobile communication device with an internet connection to the aircraft internet.

MyFlight service is an interactive real time cabin status application providing position reporting and aircraft specific configurations, including but not limited to aircraft position, speed, altitude; telephone number(s) and television channel lineups. The system includes a software system implemented to enable efficient and accurate communications between an aircraft and a user, through the use of an internet connection. The aircraft configuration and status information is based on the known space craft identity.

Figure 2:
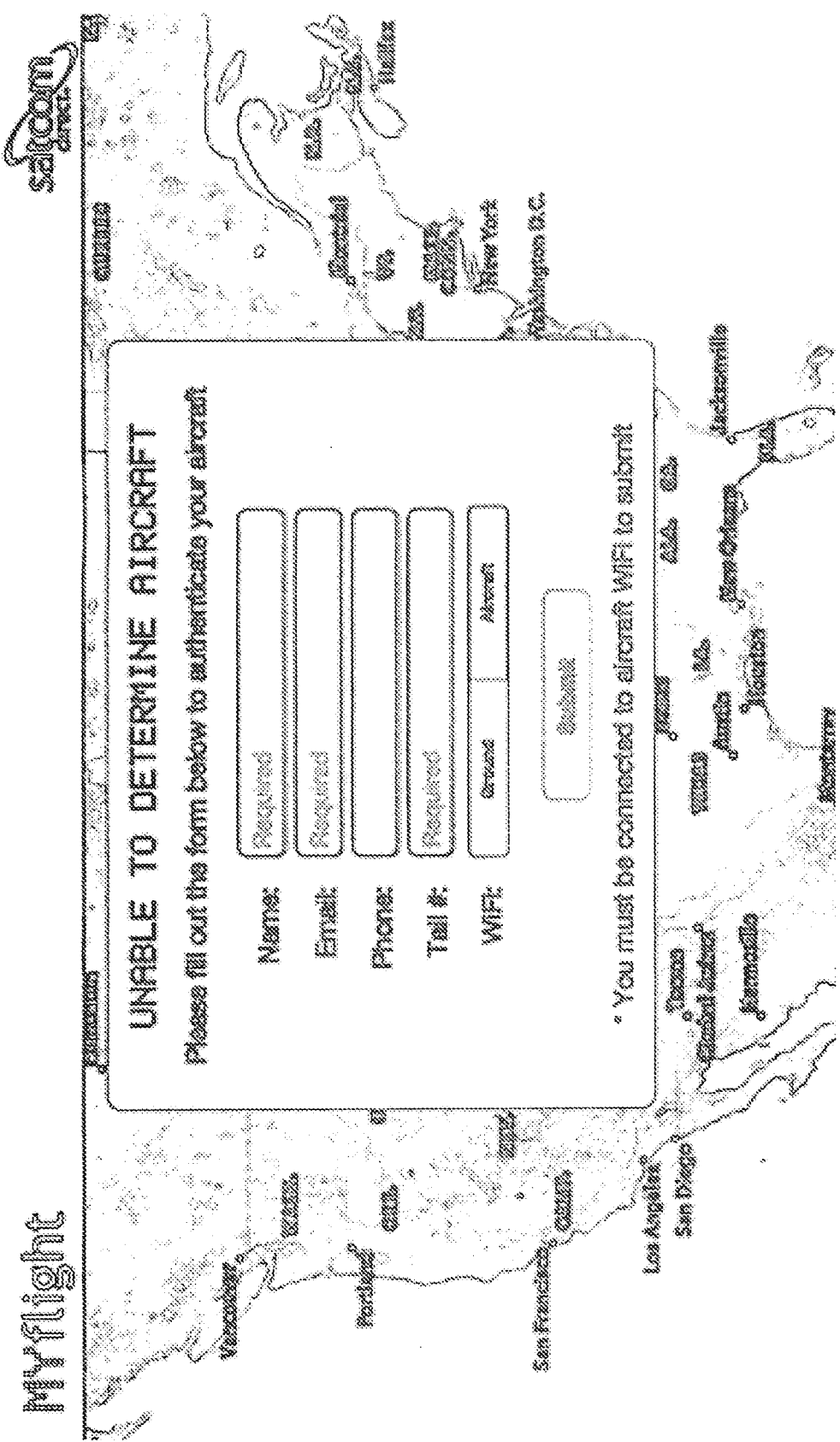
FIG. 2 is a screen shot showing access to the MyFlight system via a mobile communication device.

When the MyFlight system connects via an internet connection aboard the aircraft, the onboard internet connects to the hosted ground network. The aircraft identification is then sent to the ground network for a match with the aircraft. If the aircraft is not found, the passenger, or other user of the system is notified and no flight information is shown. FIG. 2 shows an example of a screen shot notifying the passenger that the system was unable to determine the aircraft and requesting additional information to authenticate the aircraft.

When the identity of the aircraft is matched, the correct configuration of the aircraft is returned to the system and the information displayed to the user.

Figure 1:
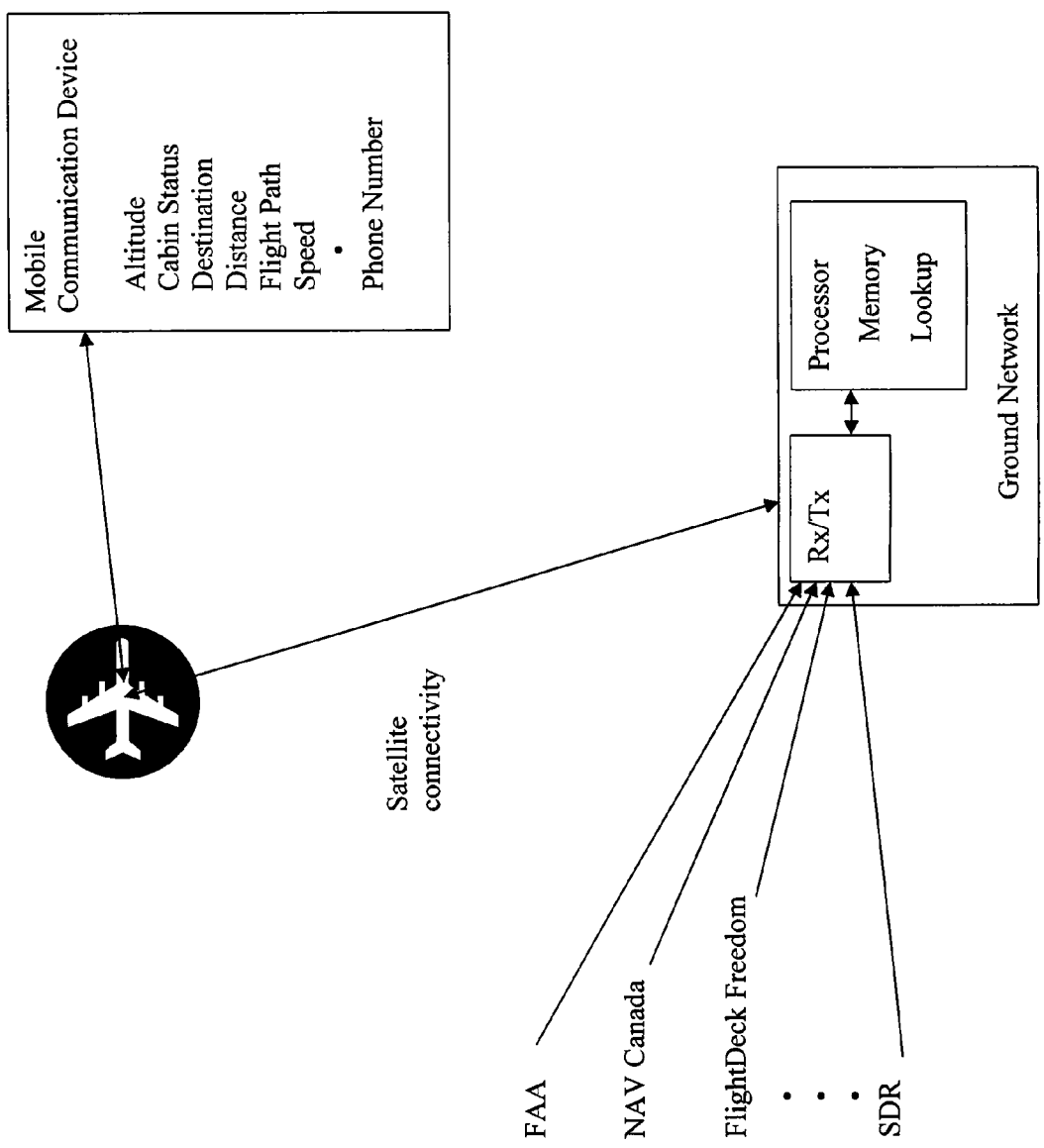
FIG. 1 shows an overview of the automated service for real-time space craft position and communication status according to the present invention.

FIG. 1 shows an overview of the MyFlight system showing the internet connection between the ground network and a non-commercial aircraft internet modem and between the aircraft internet modem and the user's mobile communication device. As shown, the MyFlight system is provided by a host via a ground station network that can be in communication with the aircraft equipment and or can communicate with the aircraft via the on-board internet. At the ground station, the MyFlight service provider receives flight related data from sources such as the U.S. Federal Aviation Authority FAA and the Canadian aviation authority NAV Canada. When available, additional information can be supplied from specific aircraft modules such as FlightDeck Freedom® (FDF). Table 1 provides an example of the information available from different third party sources and from aircraft modules.

TABLE 1

| Position Source | Speed | Altitude | Status | Distance | Flight Plan Path | Actual Plan Path |
|---|---|---|---|---|---|---|
| FAA | X | X | X | X | X | X |
| NAV Canada | X | X | X | X | X | X |
| FlightDeck Freedom | X | X | X | X | X | X |

When information is available from specific aircraft modules or more than one third party source, the ground network processor uses priority based information. For example, the FAA information can be time delayed, thus if the same information is available from another source, the other source can be given priority.

As shown, a passenger traveling on an aircraft can access the internet via the aircraft internet modem. The MyFlight system of the present invention allows passengers to activate the MyFlight service using an application on a mobile communication device such as an iPhone, iPad or other mobile device compatible with the application or from an internet website when the aircraft has a MyFlight subscription. The MyFlight service is a subscription based service that, once activated, stores the aircraft information at the ground station. The aircraft must have an active subscription, internet capabilities and provide position reports from at least one Position source listed in Table 1. Once enrolled, the passenger accesses the service via an application or website. FIG. 2 shows an example of a mobile communication device screen shot used by the passenger to automatically request real-time flight information by simply opening the MyFlight service application.

MyFlight service is fully compatible with all aviation IP-based broadband connectivity solutions to bring the fastest delivery of programming content, up-to-the-minute position reports, aircraft information, and weather data, right into the passenger's hands. No login is required, just open the application and receive the flight information. When the passenger is traveling on a non-commercial aircraft with a MyFlight subscription, the passenger can obtain the real time aircraft information via the application (app) or website. All that is required is for the passenger to download the MyFlight service app one time from an online store such as iTunes, and the app does the rest.

It is not necessary for the aircraft to have any particular hardware or flight equipment or any upgrades since all of the communication is via an internet connection and third party information sources. Once the app is activated, a request for flight information is automatically sent to the ground network using the aircraft internet connection.

As shown in FIG. 1, information displayed to the user includes altitude, cabin configuration and cabin status, distance, flight path, aircraft identifier, aircraft phone number, and the like. Cabin status can include information such as cabin configuration, and television lineup. The flight path information can include the planned flight route as well as the actual flight route. The map views are the same map views that passengers are used to—standard, hybrid, and satellite. The display can also be customized for the particular user and with the custom parameters stored at the ground network along with other stored user data.

All of the information to be displayed to the user is available from third party sources such as the FAA, NAV Canada and the like. When the aircraft is equipped with Satcom Direct service provider equipment, the MyFlight service automatically detects the equipment aboard the aircraft. Paired with the experience and reliability that Satcom Direct brings to aviation, MyFlight service enhances the passenger experience in every aircraft cabin with a MyFlight subscription.

FDF is a datalink service that is fully compatible with all avionics and airframe manufacturers. FDF is a globally redundant datalink network that provides pilots the assurance that critical data such as pre-departure clearances, Digital ATIS, oceanic clearances, airport weather, graphical weather and flight plan routes are always received upon pilot request. If a user has a FDF subscription, Myflight can access this information and display it to the user via their mobile communication device.

Figure 3:
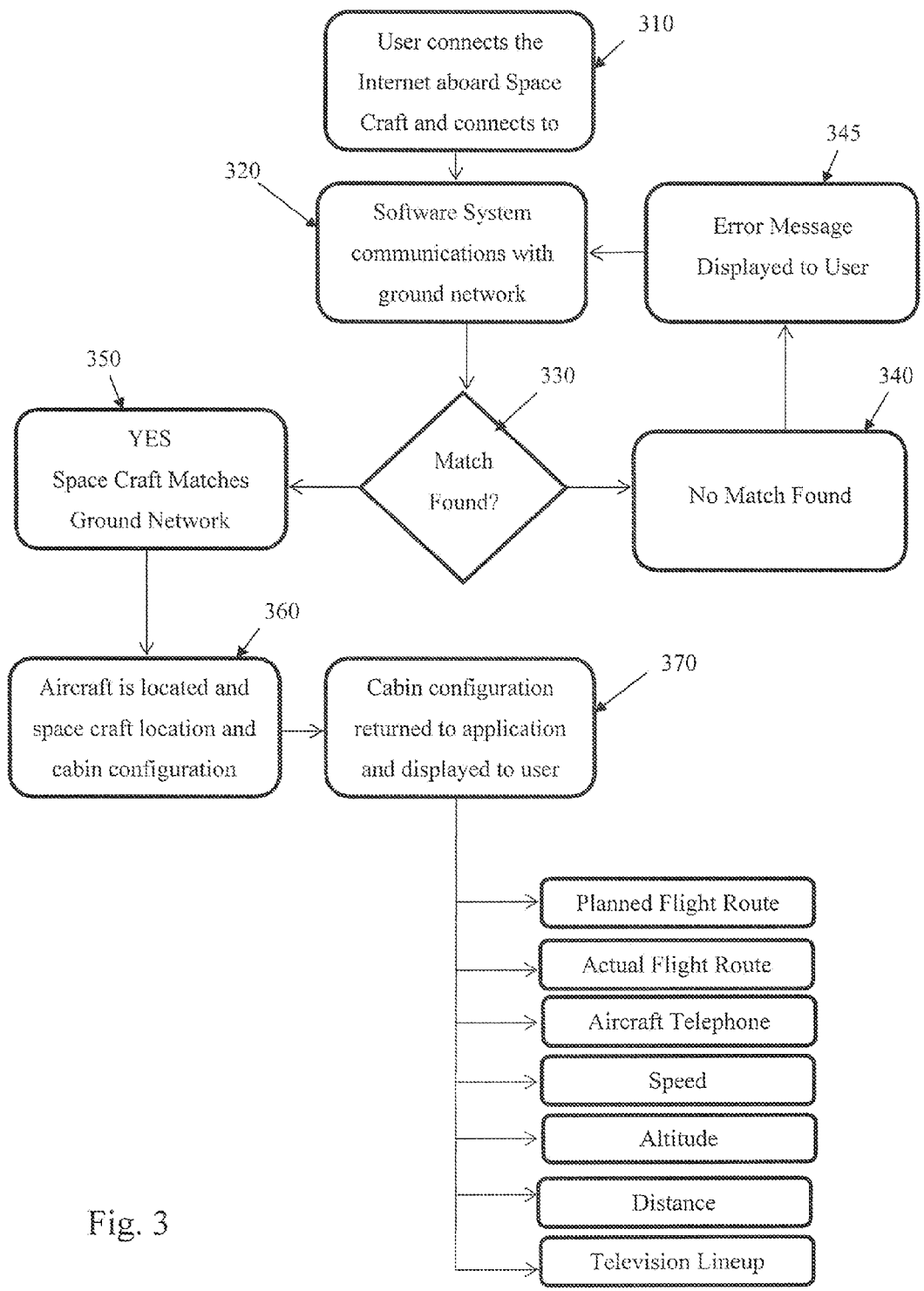
FIG. 3 is a process flow diagram for the automated service for real-time space craft position and communication status.

FIG. 3 is a flow diagram showing the operations of the MyFlight system steps according to the present invention. In step 310 the user connects to the internet aboard the space craft and launches the MyFlight application. In response to launching the application, in step 320 the software system communicates with the ground network. The ground network searches a subscription database in step 330 for the aircraft corresponding with the launch. When a match is not found in step 340, an error message is displayed to the user in step 345. When a match is found in step 350, the aircraft is located, the space craft location and cabin configuration is returned in step 360 from the ground network and in step 370 the cabin configuration is returned to the application and displayed to the user.

As shown in FIG. 3, the information displayed to the user can include planned flight route, actual fight route, aircraft telephone number, speed, altitude, distance, television lineup, and the like.

Figure 4A:
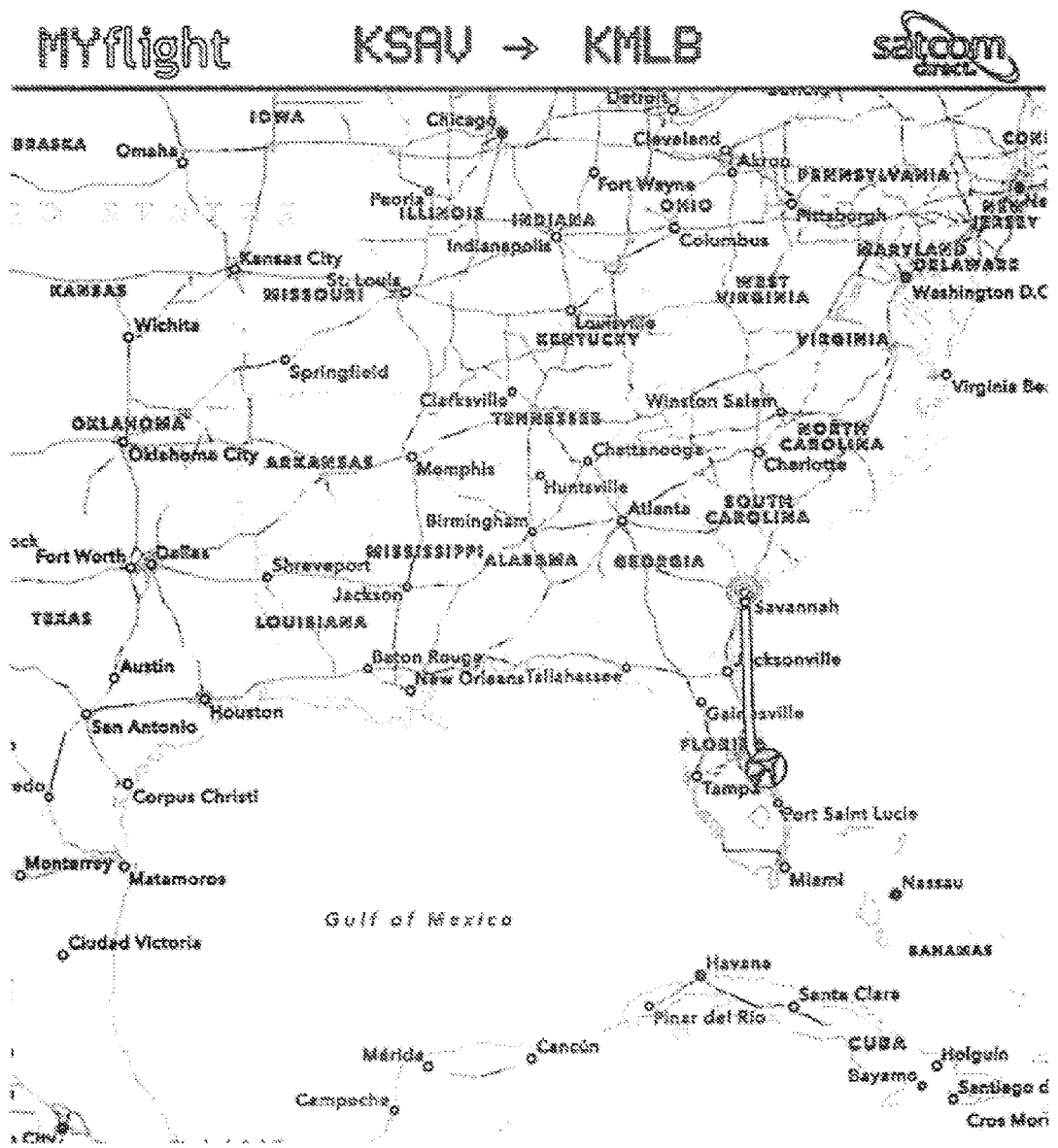
FIG. 4a is a screen shot showing an example of the informational map displayed to the user showing the flight path.
Figure 4B:
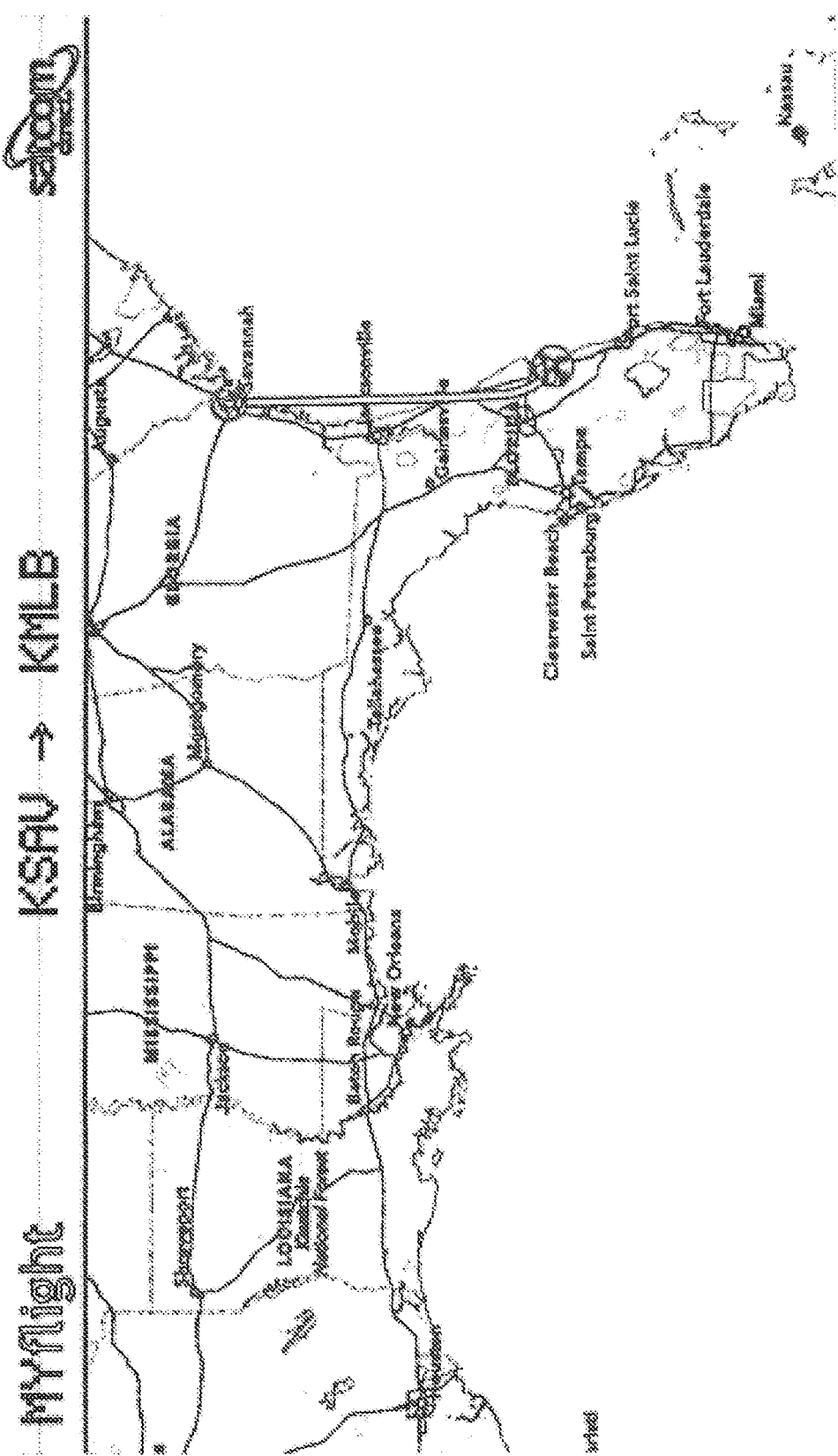
FIG. 4b shows the map of FIG. 4a when the passenger zooms into the flight area.
Figure 5:
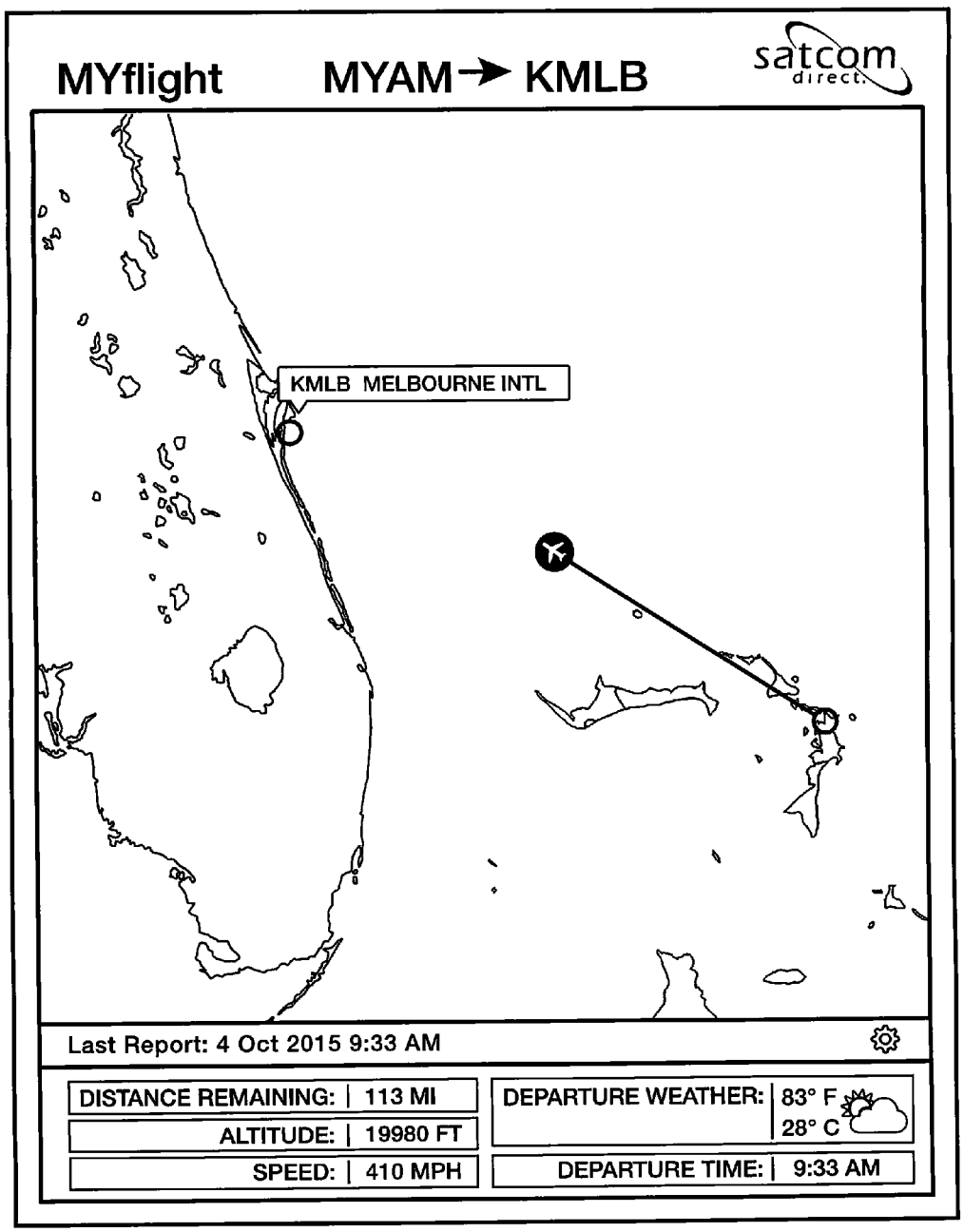
FIG. 5 shows another sample screen shot of the information displayed to a user on a mobile communication device.

FIG. 4a is a screen shot showing an example of the informational map displayed to the user showing the flight path and FIG. 4b shows the map of FIG. 4a when the passenger zooms into the flight area. FIG. 5 is another screen shot showing the informational map and providing additional information such as altitude, speed, weather, time and the like.

As referenced above, the terms space craft can include aircraft, such as but not limited to commercial and private jets, and other aircraft, as well as outer-space vehicles which can travel outside of the earth.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for displaying real-time aircraft information to a user traveling on an inflight aircraft consisting of the steps of:

providing a third party aircraft subscription service to an aircraft owner or operator to allow a user on the subscribing aircraft to access inflight aircraft position and cabin status data over time corresponding to the subscribing aircraft internet router MAC address from the third party subscription service provider;

directly connecting with the aircraft installed internet router consisting of a unique MAC address onboard the subscribing aircraft from a user mobile communication device;

launching a subscriber based aircraft status application on the user mobile communication device, the aircraft status application provided by the third party aircraft subscription service provider, the service provided limited to continuously accessing aircraft position and cabin status directly in response to the subscribing aircraft internet router MAC address from the third party aircraft subscription service provider;

automatically initiating a communication from the user mobile communication device through the aircraft internet router to a host at a ground network of the third party aircraft subscription service provider in response to launching the aircraft status application, the initialization including sending a request for inflight aircraft position and cabin status and the aircraft internet router MAC address;

inputting at the ground network the received aircraft internet router MAC address to a database for matching with a MAC address of said inflight aircraft;

on obtaining a match from said database continuously locating and compiling position and cabin status data by the host at the ground network for said aircraft;

transmitting the inflight aircraft position report and cabin status from the ground network to the user mobile communication device for display on the user mobile communication device.

2. The method of claim 1 wherein the inputting step includes the steps of:
returning and displaying an error message on the mobile communication device when a match to the MAC address for said inflight aircraft is not found.

3. The method of claim 1 wherein the launching an application step includes the steps of:
downloading the application from an online application source provider for a fee.

4. The method of claim 1 wherein the inflight aircraft position report and cabin status returned to the launched application includes third party information selected from a group consisting of destination, planned flight route, actual fight route, moving map, speed, altitude and distance.

5. The method of claim 1 wherein the cabin status from said matched MAC address includes at least one of cabin configuration, an aircraft telephone number and a television lineup matching said aircraft MAC address.

6. The method of claim 1 wherein the inputting the inflight aircraft position and cabin status step includes the step of:
receiving inflight aircraft flight related data at the ground network from one or more third party sources.

7. The method of claim 6 wherein the inputting step includes the steps of:
assigning a priority level to the inflight aircraft data received from the third party source; and compiling the position report at the ground network from the received aircraft data based on the assigned priority.

8. An automated real time cabin status and position reporting system for an inflight aircraft, consisting of:
an application launched by a user on a user mobile communication device for automatically initiating a request for the real time inflight aircraft cabin status and position report directly in response to a specific internet router MAC address installed on the inflight aircraft on which the user is traveling;

the aircraft internet router installed onboard the aircraft for automatically receiving the request and transmitting the request and the aircraft internet router MAC address corresponding to the specific inflight aircraft on which the user is traveling; and a ground network for inputting and determining at the ground network if the received aircraft internet router MAC address to a database matches with a MAC address of said inflight aircraft corresponds to an active subscription with the third party subscription service provider, said database, on obtaining a match, continuously locating and compiling inflight position and cabin status data by the host at the ground network for said inflight aircraft from said ground network the inflight aircraft position report and cabin status from the ground network to the the user mobile communication device for displaying the inflight aircraft position report and cabin status on the user mobile communication device.

9. The system of claim 8 wherein the ground network include:
said ground network including-a transceiver for receiving the real time inflight aircraft flight information from the third party source;

said database including a lookup table for matching the received aircraft internet router MAC address with a subscribing aircraft configuration data; and said database includes a processing device for executing a set of instructions for matching the received aircraft internet router MAC address with the subscribing aircraft configuration data, processing the real-time flight information corresponding to the aircraft internet router MAC address and continuously compiling the cabin status and position report from the corresponding aircraft configuration data and the incoming real time flight information.

10. The system of claim 9 wherein the set of instructions includes:
an identification subset of instructions for matching the received aircraft internet router MAC address with subscribing aircraft internet router MAC addresses in the lookup table and returning a notification to the user mobile communication device.

11. They system of claim 9 wherein the third party real time aircraft flight information includes flight information from U.S. Federal Aviation Authority FAA and the Canadian aviation authority NAV Canada.

12. The system of claim 9 wherein the aircraft position report returned to the application from the ground network is selected from a group consisting of destination, planned flight route, actual fight route, moving map, speed, altitude and distance.

13. The system of claim 9 wherein the cabin status transmitted from the ground network through the user mobile communication device includes at least one of cabin configuration, an aircraft telephone number and a television lineup corresponding to the matching aircraft MAC address.

14. The system of claim 8 wherein the application is compatible with aviation IP-based broadband connectivity solutions.

15. The system of claim 8 wherein the position report includes a moving map view.

* * * * *